L. WILLIS.
PUMPING APPARATUS.
APPLICATION FILED MAY 2, 1913.
1,081,181.
Patented Dec. 9, 1913.
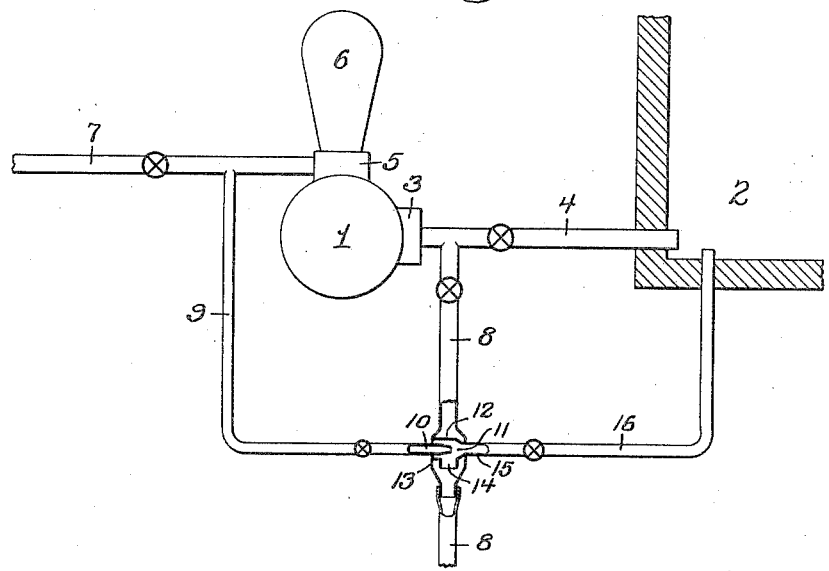
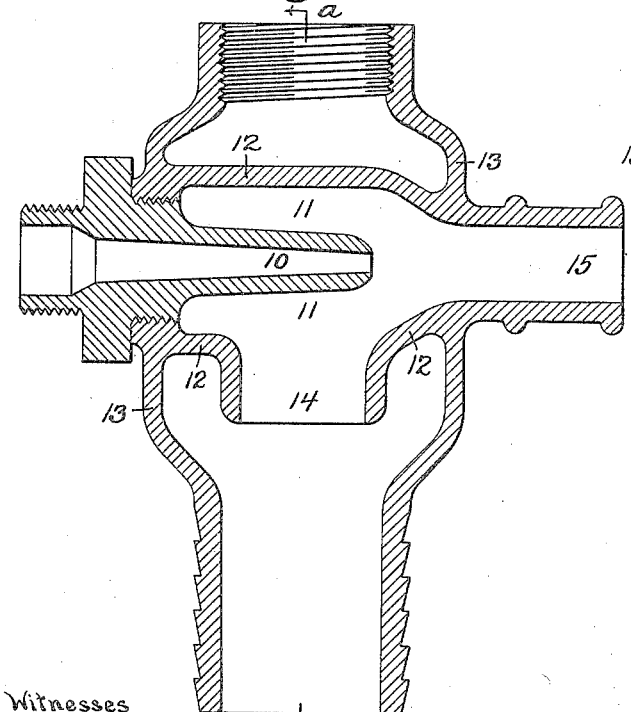
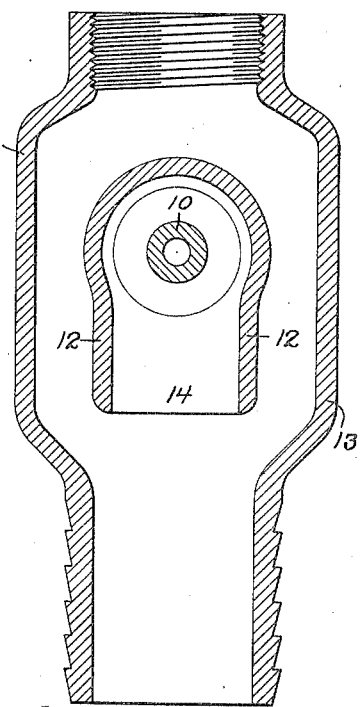
Witnesses
Inventor Leland Willis
By his Attorney Harry Smith

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

PUMPING APPARATUS.

1,081,181.  Specification of Letters Patent.  Patented Dec. 9, 1913.

Application filed May 2, 1913. Serial No. 765,045.

*To all whom it may concern:*

Be it known that I, LELAND WILLIS, a citizen of the United States, residing at Grenloch, New Jersey, have invented certain Improvements in Pumping Apparatus, of which the following is a specification.

My invention relates to that class of pumps which are normally supplied from a tank, the object of my invention being to provide for the filling of the tank by the pump while still maintaining the supply to said pump when a source of supply independent of the tank is available. This object I attain in the manner hereinafter set forth, reference being had to the accompanying drawing, in which—

Figure 1 is a diagrammatic view of a pump and tank equipped in accordance with my invention; Fig. 2 is a longitudinal section, on a larger scale, of that portion of the apparatus to which my invention particularly relates, and Fig. 3 is a transverse section on the line $a-a$, Fig. 2.

In Fig. 1 of the drawing, 1 represents the barrel of the pump which is normally supplied from a tank 2, the latter communicating with the induction chest 3 of the pump through a pipe 4.

The eduction chest 5 of the pump has an air chamber 6 and a discharge pipe 7 and the supply pipe 4 has a branch pipe 8 whereby the supply for the pump can be drawn from a well, a stream, or other source of supply, when such source is available. In order that this independent source of supply may also, at the same time, be used for filling or refilling the tank 2, I provide the delivery pipe 7 of the pump with a branch pipe 9 terminating in an injector nozzle 10 which projects into a chamber 11 contained within a casing 12, the latter extending transversely across an enlarged portion 13 of the branch pipe 8 and having, at the bottom, a flanged inlet opening 14 communicating with said pipe 8, the enlargement 13 being of such dimensions that a free flow of liquid around the casing 12 is permitted from the lower to the upper portion of said pipe 8, as illustrated in Fig. 3.

The enlarged portion of the pipe 8 has a delivery branch 15 which communicates at one end with the injection chamber 11 and at the other end with a pipe 16 leading to the tank. All of the pipes are provided with suitably located valves and when the pump is being supplied from the tank 2 the valves in the pipes 8, 9 and 16 will be closed and those in the pipes 4 and 7 opened. When, however, the independent source of supply is available, the valves in the pipes 8, 9 and 16 will be opened, the valve in the pipe 4 closed and that in the pipe 7 closed or partially closed, so as to cause the discharge, or a portion of the discharge, from the pump to be directed through the pipe 9 to the injector 10. A portion of the supply flowing through the pipe 8 will therefore be caused to enter the chamber 11 and will, by the action of the injector 10, be forced through the pipe 16 into the tank 2. When the latter has been filled or refilled the valves in the pipes 8, 9 and 16 may be closed and the valves in the pipes 4 and 7 opened so as to supply the pump from the tank, or, if the independent supply is still available, the valve in the pipe 8 may remain open and that in the pipe 4 may remain closed until it again becomes necessary for the pump to draw its supply from the tank 2.

Instead of using the injector construction shown, the pipe 9 may deliver directly into the tank if desired.

I claim:—

1. The combination of a pump and a supply tank therefor, with a pipe for supplying the pump from a source independent of the tank, and means whereby the pump may be caused to force into the tank liquid derived from said independent supply pipe.

2. The combination of a pump and a supply tank therefor, with a pipe for supplying the pump from a source independent of the tank, said pipe being also in communication with the tank and being provided with an injector in communication with the discharge from the pump, whereby a portion of the liquid flowing through said pipe may be diverted and forced into the tank.

3. The combination of a pump and a supply tank therefor, with a pipe for supplying the pump from a source independent of the tank, an injection chamber casing communicating with said pipe and with the tank, and an injector communicating with the discharge of the pump and serving to cause flow of liquid into and through the injection chamber and thence to the tank.

4. The combination of a pump and a supply tank therefor, with a pipe for supplying the pump from a source independent of the tank, an injection chamber casing crossing said pipe and having an inlet communicating with the interior of the pipe and an outlet communicating with the tank, and an injector in communication with the discharge of the pump and serving to cause passage of the fluid from said supply pipe into and through said casing and thence to the tank.

5. The combination of a pump and a supply tank therefor, with a pipe for supplying the pump from a source independent of the tank, an injection chamber casing crossing a portion of said pipe which is enlarged in size so as to provide a passage around said casing, an inlet in said casing communicating with the interior of the enlarged portion of the pipe, a delivery branch on said casing communicating with the tank, and an injector communicating with the discharge of the pump and serving to cause flow of liquid from the pipe into and through the injection chamber casing and thence to the tank.

In testimony whereof, I have signed my name to this specification, in the presence of two subscribing witnesses.

LELAND WILLIS.

Witnesses:
A. M. FANNING,
CHARLES W. FOSTER.